United States Patent [19]
Liang

[11] Patent Number: 5,507,508
[45] Date of Patent: Apr. 16, 1996

[54] TRUNK CASE ASSEMBLY

[76] Inventor: Sung-Ming Liang, No. 21, Lane 169, Fu-Shan St., Chang-Hua City, Taiwan

[21] Appl. No.: 456,935

[22] Filed: Jun. 2, 1995

[51] Int. Cl.⁶ .................................................. B62B 1/12
[52] U.S. Cl. ..................... 280/37; 280/47.18; 280/47.25; 280/47.26; 297/188.04; 297/217.1; 190/18 A
[58] Field of Search .................................. 280/30, 37, 38, 280/47.17, 47.18, 47.19, 47.24, 47.25, 47.26, 47.27, 654, 655, 47.35; 190/8, 18 A; 297/188.04, 188.07, 217.1, 45

[56] References Cited

U.S. PATENT DOCUMENTS

| | | | |
|---|---|---|---|
| 4,544,203 | 10/1985 | Younger et al. | 297/45 |
| 4,824,167 | 4/1989 | King | 297/217.1 |
| 5,374,073 | 12/1994 | Hungtlsin | 280/47.25 |

Primary Examiner—Richard M. Camby
Assistant Examiner—Frank B. Vanaman
Attorney, Agent, or Firm—Ladas & Parry

[57] ABSTRACT

A trunk case assembly includes a case body and a collapsible chair connected pivotably to a side face of the case body. The case body has a pair of engaging members and a positioning device fixed respectively to the upper and lower portions of the side face. A pair of crank arms is provided in order to connect the collapsible chair to the case body. The collapsible chair has two rectangular frames in a scissors configuration. Each crank arm has a first end connected pivotally to a respective one of the engaging members, and a second end connected pivotally to a respective one of the rectangular frames.

3 Claims, 4 Drawing Sheets

TRUNK CASE ASSEMBLY

BACKGROUND OF THE INVENTION

1. Field of the Invention

This invention relates to a trunk case assembly, more particularly to a trunk case assembly which includes a case body and a collapsible chair connected to a side face of the case body.

2. Description of the Related Art

Trunks are widely used by travelers for carrying personal articles therein. A main problem encountered by travelers who are carrying the conventional trunks is that they are sometimes unable to find a seat for resting when traveling.

SUMMARY OF THE INVENTION

It is therefore a main object of this invention to provide a trunk with a collapsible chair in order to allow a traveler to sit on the chair whenever he or she wants to rest while on a journey.

Accordingly, a trunk case assembly of the present invention comprises a case body and a collapsible chair pivotably connected to a side face of the case body. The case body has a pair of engaging members and a positioning device fixed respectively to upper and lower portions of the side face.

The collapsible chair has two rectangular frames in a scissors configuration. The lower sections of the rectangular frames engage detachably the positioning device when the rectangular frames are in a collapsed position. An elongated cloth has two end portions connected to upper sections of the rectangular frames to serve as a seat of the collapsible chair when the rectangular frames are in an extended position.

A pair of crank arms is provided in order to connect the collapsible chair to the case body. Each crank arm has a first end connected pivotally to a respective one of the engaging members, and a second end connected pivotally to a respective one of the side sections of one of the rectangular frames.

Thus, the traveler can sit on the collapsible chair when the trunk assembly of this invention is brought along when on a journey.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
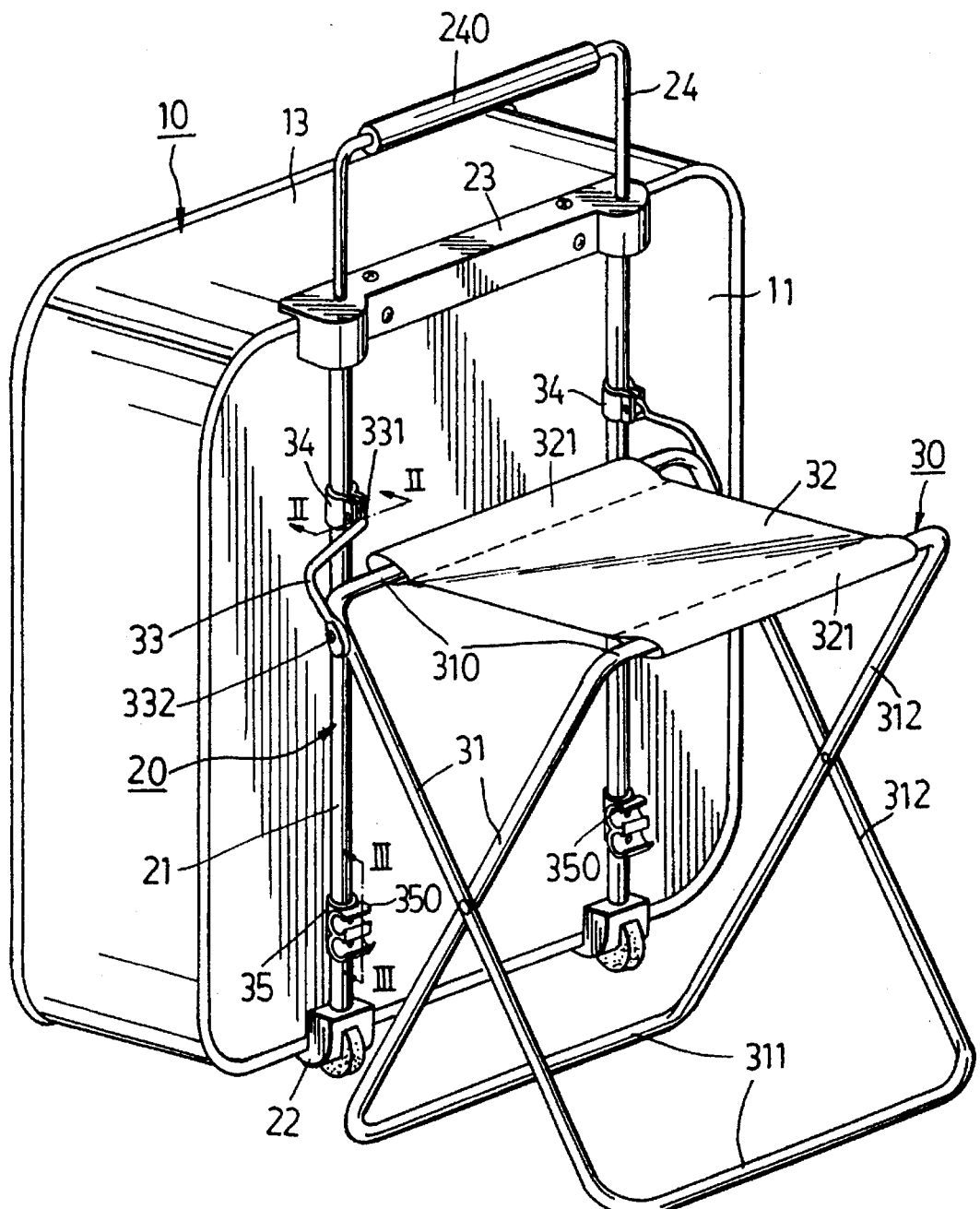
FIG. 1 is a perspective view of a preferred embodiment of a trunk case assembly according to the present invention, wherein the trunk case assembly is in an extended position.

Referring to FIG. 1, a perspective view of a preferred embodiment of a trunk assembly according to the present invention is shown to comprise a case body 10, a handle assembly 20 and a collapsible chair 30.

The case body 10 is made of a soft cloth and has a side face 11, a pair of engaging members 34 and a positioning device 35 which are fixed respectively to the upper portion and the lower portion of the side face 11. The handle assembly 20 includes a pair of parallel tube members 21, an elongated mounting block 23 which is fixed to the upper edge of the side face 11 and the upper ends of the tube members 21, and an inverted U-shaped retractable handle 24 which extends through the mounting block 23 and is retained slidably in the tube members 21. The lower ends of the tube members 21 are connected to two casters 22 which are connected to the lower edge of the side face 11. When the retractable handle 24 is pulled out from the tube members 21, the user can trail the case body 10 by grasping the upper portion 240 of the retractable handle 24.

Figure 4:
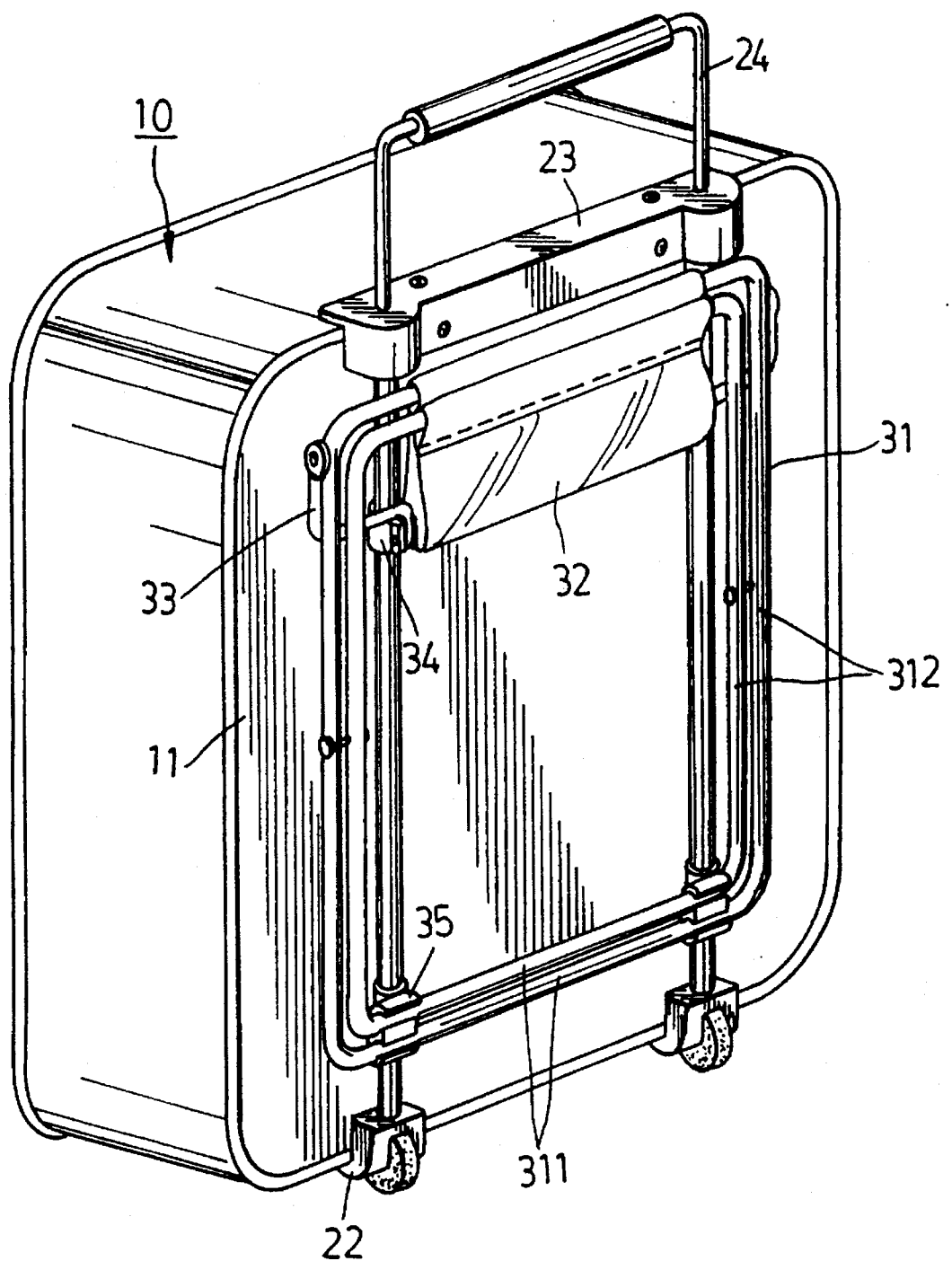
FIG. 4 is a perspective view of the trunk case assembly of FIG. 1, wherein the trunk case assembly is in a collapsed position.

The collapsible chair 30 is formed of two rectangular frames 31. Each of the rectangular frames 31 has an upper section 310, a lower section 311, and two side sections 312 connecting the upper and lower sections 310, 311. The rectangular frames 31 are pivotally connected to one another at the intermediate of the side sections 312 in a scissors configuration. An elongated cloth 32 has two end portions 321 which are connected to the upper sections 310 of the rectangular frames 31 to serve as a seat of the collapsible chair 30 when the rectangular frames 31 are in an extended position. The lower sections 311 engage detachably the positioning device 35, as shown in FIG. 4, which will be described in detail hereinbelow.

A pair of crank arms 33 interconnects the side face 11 of the case body 10 and the collapsible chair 30. More specifically, each of the crank arms 33 has a first end 331 connected pivotally to a respective one of the engaging members 34, and a second end 332 connected pivotally to a respective one of the side sections 312 of one of the rectangular frames 31, which will be described in detail later.

Figure 2:
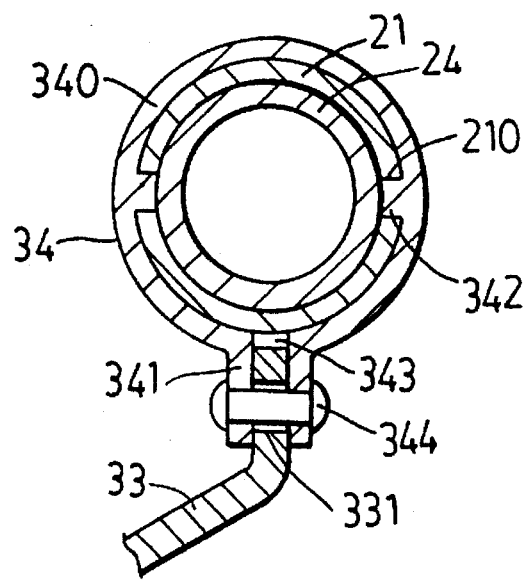
FIG. 2 is a fragmentary cross sectional view taken along the lines II—II of FIG. 1, illustrating how the engaging members are connected to an end of a crank arm of the trunk case assembly according to the present invention.

Referring to FIG. 2, in this embodiment, each of the engaging members 34 has a ring 340 with a split 343, two diametrically opposed projections 342 formed on the internal face of the ring 340, and two opposed lugs 341 which extend outward from the ring 340 adjacent to the split 343. The opposed projections 342 are inserted into the diametrically opposite holes 210 which are formed in a respective one of the tube members 21 in order to secure the engaging members 34 to the tube members 21. The opposed lugs 341 are connected pivotally to a respective one of the first ends 331 of the crank arms 33 by means of a rivet 344.

Figure 3:
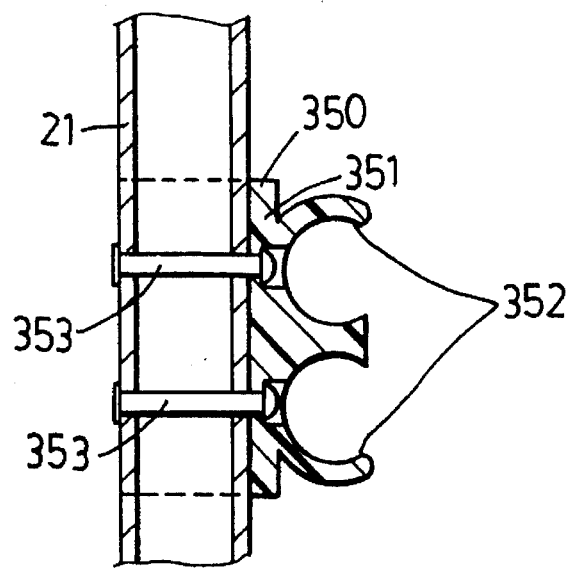
FIG. 3 is a fragmentary cross sectional view taken along the lines III—III of FIG. 1, illustrating how the positioning device is fixed to a tube member which is attached to the trunk case assembly of the present invention.

Referring to FIG. 3, the positioning device 35 includes two fastening members 350. In this embodiment, each of the fastening members 350 has a split ring member 351 which is fixed to the lower portion of the respective one of the tube members 21 by rivets 353. Each of the fastening members 350 further has two C-shaped clamps 352 which are connected to the ring members 351 in order to engage detachably and respectively the lower sections 311 of the rectangular frames 31 in the collapsed position, as best illustrated in FIG. 4.

The traveler can sit on the collapsible chair 30 by disengaging the lower sections 311 of the rectangular frames 31 from the C-shaped clamps 352 of the positioning device 35 to unfold the rectangular frames 31 to the extended position whenever he wants to rest when traveling. In addition, the side face 11 of the case body 10 can serve as a backrest when the collapsible chair 30 is unfolded.

Figure 5:
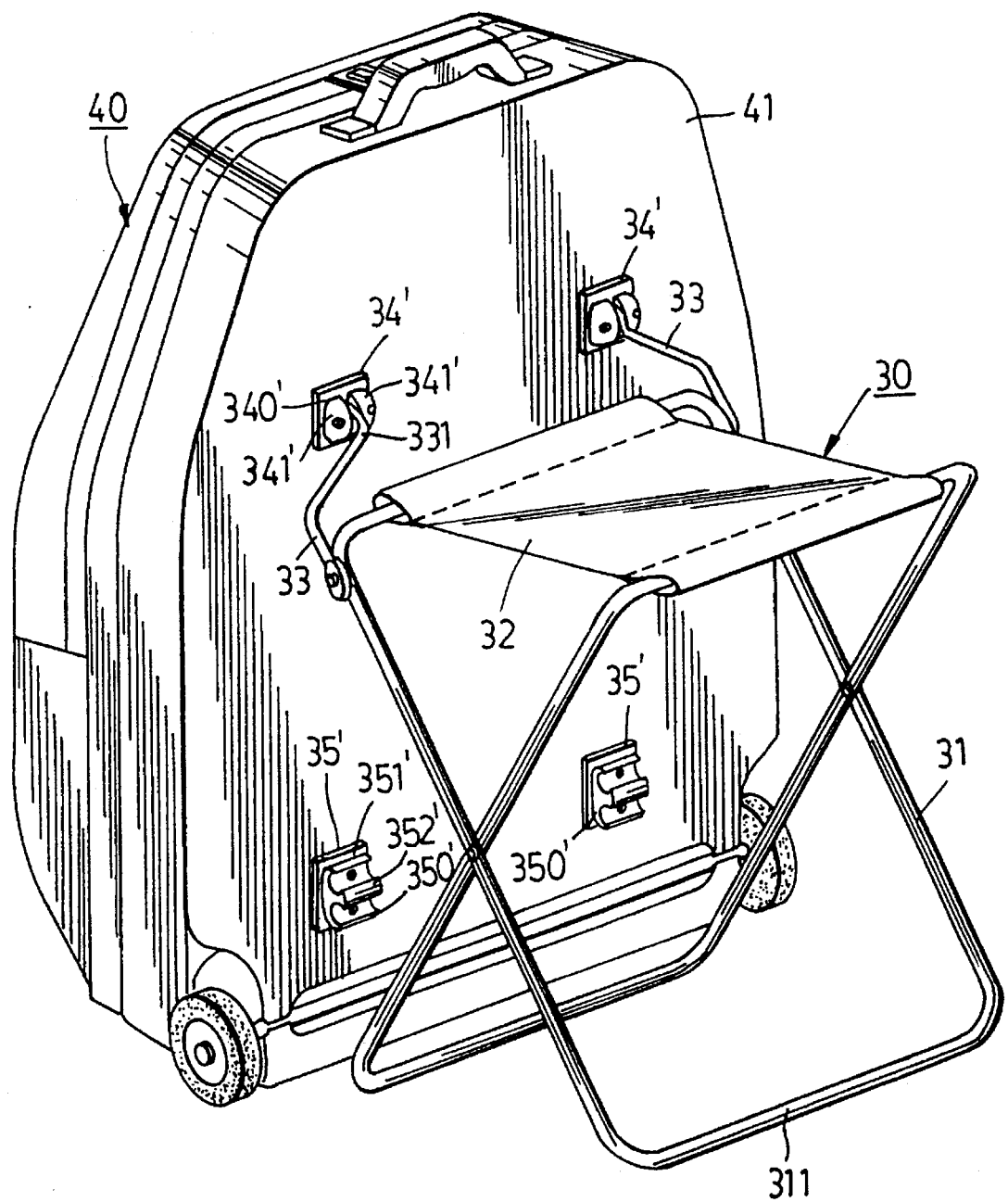
FIG. 5 is a perspective view of another preferred embodiment of a trunk case assembly according to the present invention, wherein the trunk case assembly is in an extended position.

Referring to FIG. 5, a perspective view of another preferred embodiment of the trunk case assembly according to the present invention is shown to comprise a case body 40, the collapsible chair 30 and two linking arms 33 of FIG. 1 which connect the collapsible chair 30 to the case body 40. In this embodiment, the case body 40 is mainly made of a hard material, for example, acrylonitrile-butadiene-styrene copolymer (ABS). Two engaging members 34' are fixed spacedly to the upper portion of the side face 41 of the case body 40. Each of the engaging members 34' has a first fixing plate 340' which has a first side secured to the side face 41 and an opposite second side with two protrusions 341' connected pivotally to a respective one of the first ends 331 of the crank arm 33. A positioning device 35' which consists of two fastening members 350' are fixed spacedly to the lower portion of the side face 41. Each of the fastening members 350' has a second plate 351' which has a first side fixed to the side face 41, and a second side with two C-shaped clamps 352'. The C-shaped clamps 352' and the C-shaped clamps 352 of the first embodiment have the same structure and are used to engage detachably and respectively the lower sections 311 of the rectangular frames 31 in a collapsed position. The functions and operations of the collapsible chair 30 of the first and second embodiments are the same.

With this invention thus explained, it is apparent that numerous modifications and variations can be made without departing from the scope and spirit of this invention. It is therefore intended that this invention be limited only as indicated in the appended claims.

I claim:

1. A trunk case assembly comprising:

a case body having a side face, a pair of engaging members and a positioning device which are fixed respectively to an upper portion and a lower portion of said side face;

a collapsible chair having first and second rectangular frames, each of said rectangular frames having an upper section, a lower section, and two side sections connecting said upper and lower sections, said rectangular frames being connected pivotally to one another at said side sections thereof in a scissors configuration, said lower sections of said rectangular frames engaging detachably said positioning device when said rectangular frames are in a collapsed position, said collapsible chair further having an elongated cloth with two end portions each end connected to a respective one of said upper sections of said rectangular frames to serve as a seat of said collapsible chair when said rectangular frames are in an extended position; and a pair of crank arms, each having a first end connected pivotally to a respective one of said engaging members, and a second end connected pivotally to a respective one of said side sections of said first rectangular frame in order to connect said collapsible chair to said case body.

2. A trunk case as claimed in claim 1, wherein said side face of said case body has a pair of parallel tube members fixed thereto and an inverted U-shaped retractable handle retained slidably in said tube members, each of said tube members having two diametrically opposite holes formed adjacent to an upper end thereof, each of said engaging members having a ring with a split, two diametrically opposed projections formed on an internal face of said ring and inserted into said diametrically opposite holes of a respective one of said tube members, and two opposed lugs which extend outward from said ring adjacent to said split, said lugs being connected pivotally to a respective one of said first ends of said crank arms, said positioning device including two fastening members, each of said fastening members having a split ring member fixed to a lower portion of the respective one of said tube members, each of said fastening members further having two C-shaped clamps which are connected to said ring members in order to engage detachably and respectively said lower sections of said rectangular frames in said collapsed position.

3. A trunk case as claimed in claim 1, wherein each of said engaging members includes a first fixing plate which has a first side secured to said side face of said case body and an opposite second side with two protrusions connected pivotally to a respective one of said first ends of said crank arm, said positioning device including two fastening members, each of said fastening members having a plate which has a first side fixed to said side face of said case body, and a second side with two C-shaped clamps which engage detachably and respectively said lower sections of said rectangular frames in said collapsed position.

\* \* \* \* \*